United States Patent [19]
Legris

[11] 3,909,046
[45] Sept. 30, 1975

[54] CONNECTOR FOR FLUID CONDUITS, SUCH AS SEMI-RIGID PIPES

[75] Inventor: Andre Legris, St-Maur, France

[73] Assignee: Societe Legris France S.A., Ozoir-la-Ferriere, France

[22] Filed: Mar. 13, 1974

[21] Appl. No.: 450,680

[30] Foreign Application Priority Data
Apr. 24, 1973 France .............................. 73.14831

[52] U.S. Cl. .................. 285/39; 285/158; 285/308; 285/323; 403/16; 403/374
[51] Int. Cl.² ......................................... F16L 55/00
[58] Field of Search ............ 285/39, 322, 323, 308, 285/24, 27, 340, 369, 158; 403/16, 374

[56] References Cited
UNITED STATES PATENTS

| | | |
|---|---|---|
| 2,447,221 | 8/1948 | Warring .......................... 285/340 X |
| 3,312,483 | 4/1967 | Leadbetter et al. ................ 285/340 |
| 3,653,689 | 4/1972 | Sapy et al. ...................... 285/322 X |
| 3,669,475 | 6/1972 | Luckenbill et al. ............. 285/369 X |

FOREIGN PATENTS OR APPLICATIONS
1,962,884   7/1970   Germany ........................... 285/308

Primary Examiner—Werner H. Schroeder
Assistant Examiner—Moshe I. Cohen
Attorney, Agent, or Firm—Stevens, Davis, Miller & Mosher

[57] ABSTRACT

This invention relates to a connector for fluids, such as semi-rigid pipes. The connector includes a body member, a collar received in the body member, a clamp with pipe engaging jaws at least one guide for guiding the connector into the pipe and an abutment member for limiting movement of the clamp.

8 Claims, 14 Drawing Figures

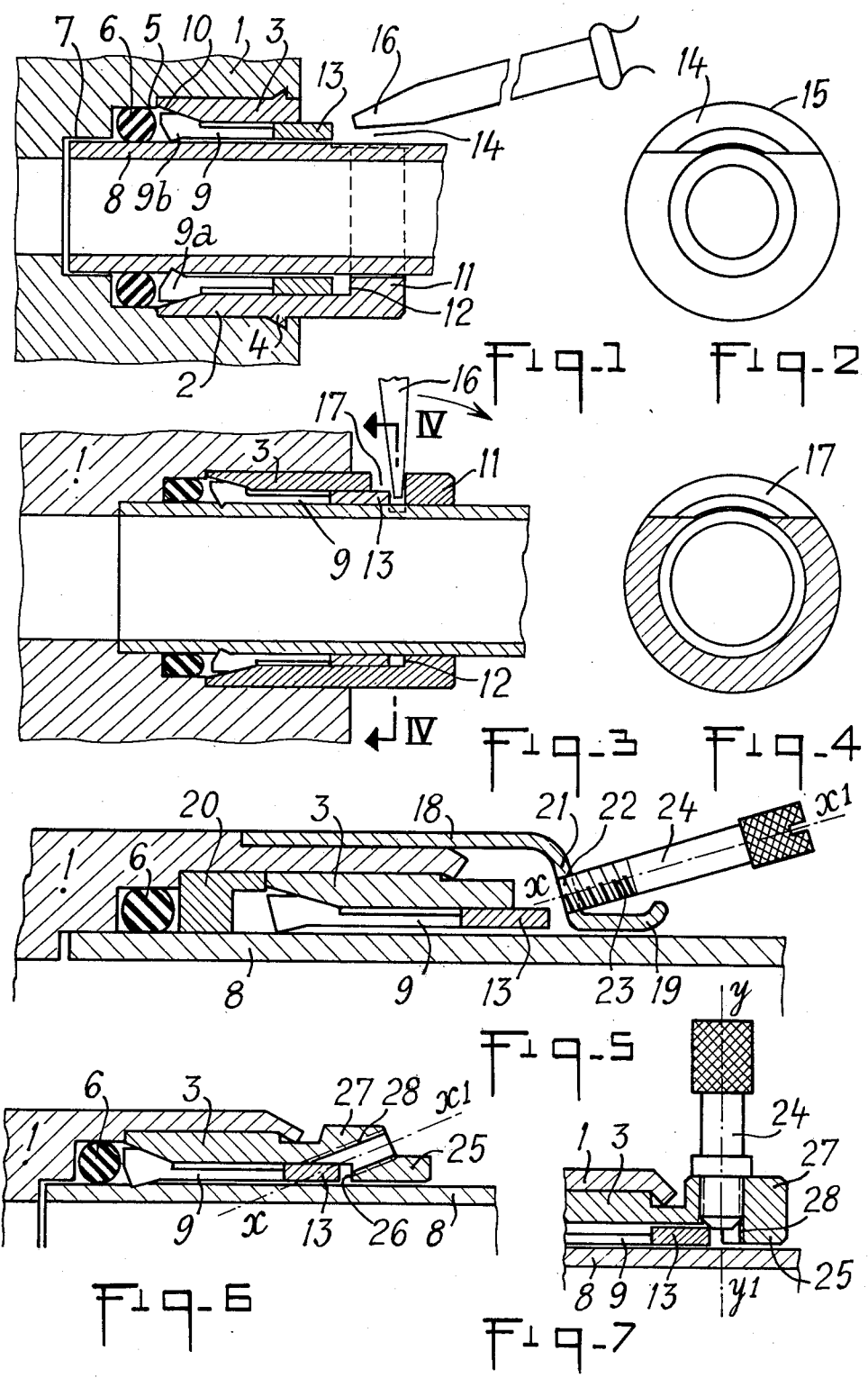

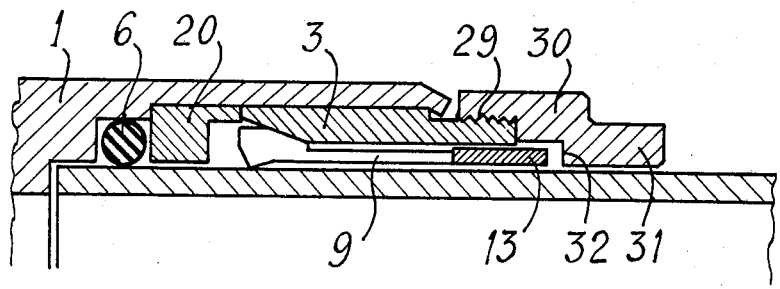
Fig-8
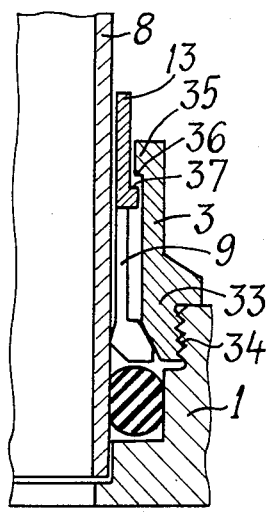 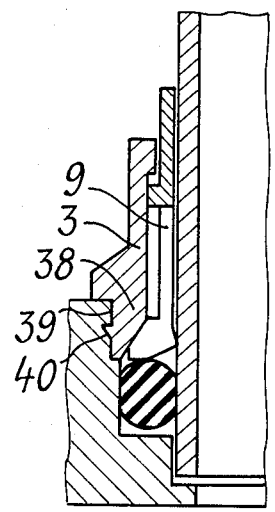 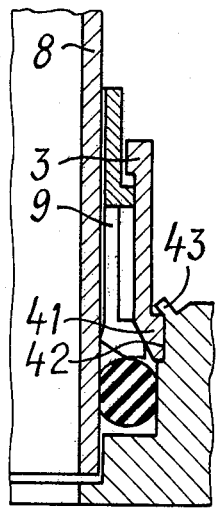
Fig-9   Fig-10   Fig-11

CONNECTOR FOR FLUID CONDUITS, SUCH AS SEMI-RIGID PIPES

The present invention relates to a fluid coupling for a fluid conduit such as a semi-rigid pipe.

U.S. Pat. No. 3,653,689 there is known a device for connecting conduits of fluid wherein a collar engaged in an orifice of the coupling body internally receives a flexible clamp having a plurality of jaws which are capable of being engaged in the wall of the conduit to be connected, the said collar having in its bore a diverging zone for tightening the jaws of the clamp.

Sealing is ensured by an O-ring of elastomeric material disposed between the body and the pipe.

According to the present invention there is provided a connector for a fluid conduit, such as a semi-rigid pipe such a connector comprising a body member having an opening therein, a collar adapted to be received in the opening of the body member, a flexible clamp adapted to be received in the collar, the clamp including a plurality of jaws capable of engaging the walls of a pipe to be connected, the collar being provided with a flared portion for forcing the jaws of the clamp into engagement with the walls of a pipe, an O-ring seal for sealing the pipe with respect to the connector, a guide for guiding the pipe into the connector and an abutment member for limiting travel of the clamp.

Illustrative embodiments of the present invention will now be described with reference to the accompanying drawings, in which:

FIG. 1 is a view in longitudinal section of one form of coupling;

FIG. 2 is an end view of the coupling of FIG. 1;

FIG. 3 is a view in longitudinal section of a further form of the coupling;

FIG. 4 is a view in section taken along line IV—IV of FIG. 3;

FIG. 5 is a part view in longitudinal section of a coupling equipped with an overlapping socket and a release tool;

FIG. 6 is a part view in longitudinal section of a coupling equipped with an inclined release tool;

FIG. 7 is a part view of a modified form of the release tool shown in FIG. 6;

FIG. 8 is a part view in longitudinal section of a coupling which includes a screwed nut;

FIG. 9 is a part view in section of a coupling having a screwed collar;

FIG. 10 is a part view in section of a coupling having a sleeve-jointed collar;

FIG. 11 is a part view in section of a coupling having a crimped collar;

Figure 12:
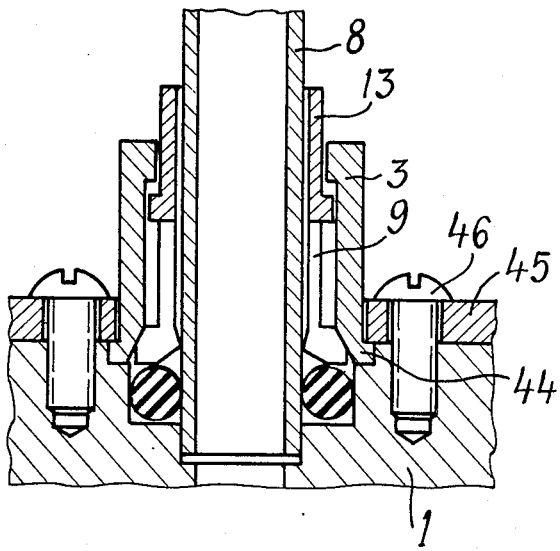
FIG. 12 is a view in section of a coupling, having a collar which is retained by an anchor plate.

Referring now to FIGS. 1 and 2 there is shown a coupling which includes a body 1 having a first bore 2 in which there is force sleeve-jointed a collar 3 having teeth 4 engaged in the material forming the body. The body 1 is also provided with a bore 5 receiving an O-ring 6 and a bore 7 receiving the end of a pipe 8.

Slidingly mounted in the collar 3 is a clamp 9 having slits which define jaws $9a$ having at their ends edges $9b$ which are capable of being engaged in the wall of the pipe 8 when the clamp abuts against a flared portion 10 of the collar.

The collar 3 includes an annular rib 11 for guiding the pipe 8 into the coupling. The rib 11 has an annular abutment surface 12 against which the tail 13 of the clamp 9 is capable of abutting.

On the collar 3 and the rib 11 there is provided a milled recess 14 in the shape of a half moon which extends along an arc of a circle 15 (see FIG. 2) for engagement by a tool 16 against the tail of the clamp, to enable the clamp 9 to be released when the latter is engaged, by its edges $9b$, in the pipe 8.

FIGS. 3 and 4 show a coupling similar to the one shown in FIGS. 1 and 2 but wherein a milled slot 17 is provided in place of the recess 14. This slot makes it possible to introduce a tool 16 for laterally releasing the clamp 9 when the edges of the jaws $9a$ are engaged in the pipe 8.

In FIG. 5 there is shown a coupling comprising a socket 18 which is sleeve-fitted over the body 1 and which completely overlaps the end of the collar 3 and the tail 13 which extends outside the body 1. The socket 18 has a tubular portion 19 which co-operates with a ring 20 for guiding the pipe 8 into the coupling. The socket 18 also has an annular abutment wall 21 against which the tail 13 of the clamp 9 is capable of abutting. In this wall 21 there is provided a tapped bore 22 the axis $x-x_1$ of which is inclined with respect to the axis of the pipe 8 and in which is screwed the threaded portion 23 of a tool 24 capable of pushing the tail 13 of the clamp 9 to release the latter from the pipe 8.

FIG. 6 shows a coupling in which the collar 3 is extended by a tubular portion 25 completely surrounding the tail 13 of the clamp 9 and forming a member for guiding the pipe 8. Interiorly of the tubular portion 25 there is provided an annular abutment surface 26 against which the tail 13 of the clamp 9 can abut.

In a widened portion 27 of the collar 3 there is provided a tapped bore 28 to the axis $x-x_1$ of which is inclined with respect to the axis of the pipe 8 and in which a tool 24 (FIG. 5) can be engaged to release the clamp 9 by acting on the tail 13.

According to a further embodiment shown in FIG. 7 the tapped bore 28 in the portion 27 of the collar is arranged to have its axis $y-y_1$ perpendicular to the axis 8 of the pipe, such that the tool 24 acts laterally on the tail 13 of the clamp 9, so as to push the latter back.

FIG. 8 shows a coupling in which the collar 3 has a threaded portion 29 onto which there is screwed a nut 30 having a tubular portion 31 for guiding the pipe 8 and an annular abutment face 32 against which the tail 13 of the clamp 9 can abut.

Externally the nut 30 may have a knurled portion and a six-sided portion.

In FIGS. 9, 10, 11 and 12 there is shown a coupling in which the collar 3 and the clamp 9 are positioned outside the body 1.

The coupling shown in FIG. 9 comprises a collar 3 having a threaded flange 33 screwed into a tapped bore 34 of the body 1. The collar 3 has a rib 35 which ensures guidance of the pipe and comprises an abutment surface 36 against which a face 37 of the tail 13 of the clamp 9 is capable of abutting.

The coupling shown in FIG. 10 comprises a collar 3 having a flange 38 which is force sleeve-jointed in a bore 39 of the body 1. On the flange 38 there are provided teeth 40 which are engaged in the material forming the body 1.

In FIG. 11 there is shown a coupling in which the collar 3 has a flange 41 mounted in a bore 42 of the body 1, the said flange 41 being retained by a crimping 43 of the body 1 on the flange 41.

In FIG. 12 there is shown a coupling in which a flange 44 of the collar 3 is retained by an anchor plate 45 secured by means of bolts 46 in the body 1.

Figure 13:
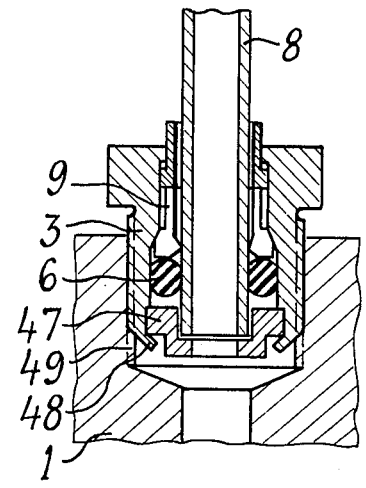
FIG. 13 is a view in section of a coupling having a collar which is screwed in the body of the coupling.

In FIG. 13 there is shown a coupling in which the collar 3 simultaneously contains the clamp 9 and the O-ring 6, the said collar being closed by a washer 47 and crimped at 48.

The thus formed coupling assembly has a threaded collar 3 which is screwed into a tapped bore 49 of the body 1.

Figure 14:
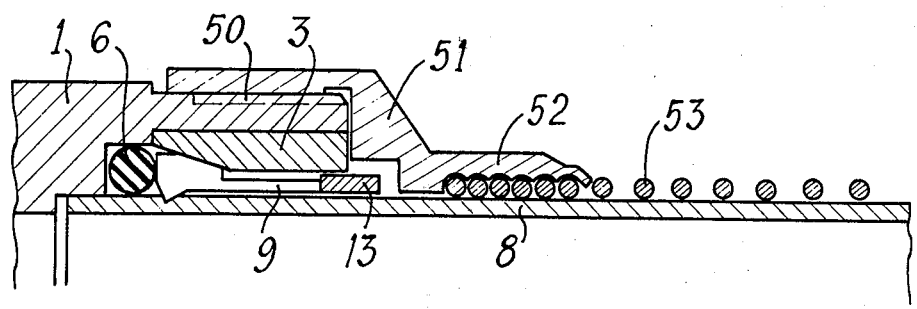
FIG. 14 is a part view in section of a coupling comprising a guide for a spring placed around the pipe to be coupled.

In FIG. 14 there is shown a coupling in which the body 1 has a threaded portion 50 onto which there is screwed a socket 51 surrounding the tail 13 of the clamp 9, the said socket 51 comprising a sleeve 52 for guiding a spring 53 disposed around the flexible pipe 8.

The embodiments shown in FIGS. 10 to 14 all include abutment surfaces similar to other embodiments described against which the tail of the clamp 9 can abut and a rib equivalent to the rib 35 of the embodiment shown in FIG. 9 for guiding the pipe into the connector. In all the embodiments shown in the drawings, the abutment surface for the clamp limits movement of the clamp in the connector.

I claim:

1. A releasable coupling device for a pipe, said coupling comprising a body having first, second, third and fourth concentric bores, a collar retained in said first bore and having an inner surface inclined to the axis of the bores, a clamping member disposed about a pipe and within the collar for axial movement relative thereto, said clamping member comprising a plurality of flexible jaws and means cooperating with the inclinded surface of the collar for driving the jaws inwardly to clamp the pipe upon relative movement between the collar and clamping member, means in the second bore for forming a seal between the outer surface of the pipe and the wall of the second bore, said pipe being disposed in the first, second and third bores, and means fixed to the collar for guiding the pipe into the coupling having an abutment member for the end of the clamp.

2. A connector according to claim 1, in which the collar includes an annular rib constituting said guiding means which extends beyond the body member for guiding the pipe, said rib including an annular member which constitutes said abutment surface.

3. A connector according to claim 2, in which the rib and a portion of the collar include means defining a recess adapted to receive a release tool for releasing a pipe from the clamp.

4. A connector acccording to claim 2, which includes means defining a slot adapted to receive laterally a release tool for releasing a pipe from the clamp.

5. A connector according to claim 1, which includes means defining a bore in the collar portion to allow access of a release tool for releasing a pipe from the clamp.

6. A connector according to claim 1, which includes a member which surrounds any portion of the collar and clamp extending beyond the body member, said member including tubular portion for guiding a pipe and an annular surfaced constituting said abutment.

7. A connector according to claim 1, which includes a nut attached to the ring, said nut including an abutment surface for the clamp and a guide surface for guiding the pipe.

8. The coupling of claim 1 wherein said means for guiding the pipe has means for access through the collar to the clamp for release thereof from its engagement with the pipe.

* * * * *